US012669844B2

(12) United States Patent
Deligiannis et al.

(10) Patent No.: US 12,669,844 B2
(45) Date of Patent: Jun. 30, 2026

(54) SYNCHRONIZER CIRCUIT

(71) Applicant: Nordic Semiconductor ASA, Trondheim (NO)

(72) Inventors: Sergio Nicolas Deligiannis, Farnham (GB); Robert Jackson, Farnham (GB)

(73) Assignee: Nordic Semiconductor ASA, Trondheim (NO)

( * ) Notice: Subject to any disclaimer, the term of this patent is extended or adjusted under 35 U.S.C. 154(b) by 141 days.

(21) Appl. No.: 18/420,633

(22) Filed: Jan. 23, 2024

(65) Prior Publication Data
US 2024/0255985 A1 Aug. 1, 2024

(30) Foreign Application Priority Data
Jan. 26, 2023 (GB) ...................................... 2301126

(51) Int. Cl.
*G06F 1/12* (2006.01)
(52) U.S. Cl.
CPC ...................................... *G06F 1/12* (2013.01)
(58) Field of Classification Search
CPC ..... G06F 1/12; G06F 1/08; G06F 1/06; G06F 1/10
See application file for complete search history.

(56) References Cited

U.S. PATENT DOCUMENTS

| | | | | |
|---|---|---|---|---|
| 6,734,709 B1 * | 5/2004 | Zhu | ........................... | H03K 5/04 |
| | | | | 327/171 |
| 7,256,627 B1 * | 8/2007 | Talbot | ....................... | G06F 1/12 |
| | | | | 327/146 |
| 9,471,091 B2 | 10/2016 | Dally et al. | | |
| 2008/0226004 A1 * | 9/2008 | Oh | ......................... | H03L 7/0814 |
| | | | | 375/354 |
| 2009/0153194 A1 * | 6/2009 | Cumming | .......... | H03K 5/15066 |
| | | | | 327/291 |
| 2013/0314134 A1 * | 11/2013 | Kulmala | ................... | G06F 1/10 |
| | | | | 327/155 |
| 2014/0132245 A1 | 5/2014 | Dally et al. | | |

OTHER PUBLICATIONS

IPO Combined Search and Examination Report under Sections 17 and 18(3) for Great Britain Application No. 2301126.5, dated Jul. 27, 2023, 6 pages.

* cited by examiner

*Primary Examiner* — Raymond N Phan
(74) *Attorney, Agent, or Firm* — Klarquist Sparkman, LLP

(57) ABSTRACT
A circuit portion receives, at a synchroniser, a signal clocked at a first frequency and outputs a synchronised signal clocked at a second frequency to a bounce-rejection circuit portion. The bounce-rejection circuit portion operates on a plurality of successive samples of the synchronised signal and outputs an output signal. The bounce-rejection circuit portion: changes the output signal from a first value to a second value if a proportion of said plurality of successive samples having said second value is determined to meet a threshold, the threshold being greater than 50% of the plurality of successive samples; otherwise, it maintains the output signal at the first value.

20 Claims, 5 Drawing Sheets

SYNCHRONIZER CIRCUIT

CROSS-REFERENCE TO RELATED APPLICATION

This application claims priority from Great Britain Patent Application No. 2301126.5, filed on Jan. 26, 2023, which application is incorporated herein by reference in its entirety.

TECHNICAL FIELD

This invention relates to circuit portions for rejecting bounces from synchronised signals; handshake synchroniser systems comprising said circuit portions and corresponding methods.

BACKGROUND

Metastability in digital systems is a feature of having more than one independent clock domain and can cause system failures if not properly addressed by the circuit designer. When passing a signal or vector (i.e. a multi-bit signal) between two different clock domains clocked by different clock frequencies, undesirable signal bounces can occur. Signal bounces can be defined as inaccurate pulses that arise from sampling in the metastable state.

Causes of signal bounces include: ringing lines, external noise, glitches (e.g. if the outputs from the source are not registered) and mechanical bounces from a switch etc. For example, if an asynchronous signal is ringing at the input of a higher frequency clock domain, sampling can occur during this metastable 'forbidden' state, i.e. where the output is unpredictable.

Signal bounces in digital circuits can undesirably lead to the loss of samples or the production of extra 'false' samples. Typically, designers build delay times into digital systems to reduce the likelihood of metastability failures to a tolerable level.

The present invention aims to provide an improved solution to at least some of these problems.

SUMMARY

From a first aspect, the invention provides a method of operating a circuit portion, comprising:

receiving, at a synchroniser, a signal clocked at a first frequency;

outputting a synchronised signal clocked at a second frequency to a bounce-rejection circuit portion;

the bounce-rejection circuit portion operating on a plurality of successive samples of the synchronised signal and outputting an output signal, wherein the bounce-rejection circuit portion:

changes the output signal from a first value to a second value if a proportion of said plurality of successive samples having said second value is determined to meet a threshold, wherein the threshold is greater than 50% of the plurality of successive samples; or otherwise, maintains the output signal at the first value.

From a second aspect, the invention provides a circuit portion comprising:

a synchroniser comprising:

a signal input for receiving a signal clocked at a first frequency; and a signal output for outputting a synchronised signal clocked at a second frequency; and a bounce-rejection circuit portion arranged to receive a synchronised signal from the output of the synchroniser; the bounce-rejection circuit portion being arranged to operate on a plurality of successive samples of the synchronised signal and output an output signal; wherein the bounce-rejection circuit portion is arranged to:

change the output signal from a first value to a second value if a proportion of said plurality of successive samples having said second value is determined to meet a threshold, wherein the threshold is greater than 50% of the plurality of successive samples; or otherwise, maintain the output signal at the first value.

Thus, it will be seen by those skilled in the art that in accordance with the invention, a bounce-rejection circuit portion only changes its output to a different value if the proportion of samples having that different value reaches a threshold, the threshold being greater than 50%. Otherwise, the output of the bounce-rejection circuit portion remains the same. This may help to avoid bounces being propagated through a circuit and thus to prevent system failures or sample errors. Such bounce-rejection circuit portions may usefully be implemented at clock domain crossings at the output of a synchroniser.

By providing a bounce-rejection circuit portion at the output of a synchroniser, undesired pulses resulting from sampling in a metastable state can be filtered from the synchronised signal. Therefore, embodiments of the present invention may provide improvements to the robustness of a synchroniser.

As outlined above, the bounce-rejection circuit portion may improve the robustness of the system against unwanted and unexpected bounces. This is particularly important in cases where the asynchronous input is ringing or deteriorated (i.e. causing temporary undesirable oscillations in what ideally should be a monotonic function). One example of when a 'ringing' input can cause problems is in the synchronisation between a Serial Peripheral Interface (SPI) peripheral and a faster core clock, where the SPI signals could be deteriorated by the inductance-resistance-capacitance (LRC) characteristics of the wires, thus affecting the transition of the asynchronous input.

As will be appreciated by the skilled person, metastability is a problem of digital circuits. The signal is typically a digital signal, e.g. the first value may be "1" and the second value may be "0" or vice versa. Therefore, the possible values at the output of the bounce rejection circuit portion may be "0" or "1". The signal may be a data signal, which is clocked by a clock signal at the first frequency.

In a set of preferred embodiments, the threshold is a proportion of the plurality of successive samples below 100%—e.g. below 90%—e.g. below 80%—e.g. from 60% to 80%. The bounce-rejection circuit portion, therefore, may not require all of the samples to be the same before updating the output to a new value. The Applicant has identified that this helps to decrease the latency, e.g. between the transition of the signal at a transmitter and the transition of the signal after bounce rejection. A proportion that is not 100% may still be effective enough at rejecting all unwanted bounces. Such embodiments may help to improve the rejection of the undesired bounces at the output of a synchroniser while reacting fast to actual transitions.

The threshold has been described above as a proportion of the successive samples of the synchronised signal. However, in a set of embodiments, the threshold proportion is also greater than a minimum threshold number of the plurality of successive samples having the second value (i.e. a minimum number of matching samples rather than a minimum percentage).

In a set of preferred embodiments, an estimate of the number of metastable samples (MS) is determined and the threshold is set to be greater than half of this estimate (MS/2), i.e. being the minimum threshold number of the plurality of successive samples having the second value. The estimated number of metastable samples may be understood as the number of samples that are expected to be taken in the metastable state (of a signal) for a particular clock domain crossing. The metastable state is typically a region between the first and second value (e.g. "1" and "0") that a signal will enter when changing between the first and second value (i.e. at a rising or falling signal edge). While the signal is within that metastable state, the value that will be sampled is unpredictable. As samples are typically taken every clock cycle, more samples will be taken when a clock rate is higher. It follows, therefore, that more metastable samples would be taken when the clock frequency of the synchroniser is higher.

The largest possible bounce has a period of MS samples with MS/2 samples having the first value and MS/2 samples having the second value. Therefore, in embodiments where the threshold is set to be greater than MS/2, the bounce-rejection circuit portion should be able to filter the lowest frequency bounce possible, i.e. the largest bounce possible. This can ensure that all or nearly all bounces can be discarded which may help to provide a clean transition at the output of the bounce-rejection circuit portion.

In a set of embodiments, the threshold is at least the number of metastable samples plus one, all divided by two $$-\text{i.e. } P_{opt} = \text{ceil}\left(\frac{MS+1}{2}\right),$$

where $P_{opt}$ is the minimum number of samples capable of filtering all the possible transitions when having MS metastable samples and MS is the number of metastable samples. Such a threshold has been determined by the Applicant to be particularly effective as it ensures all possible bounces are rejected while not unnecessarily sacrificing latency.

As would be appreciated by the skilled person, there are a number of ways that the estimated number of metastable samples can be determined. For example, an estimate of the number of metastable samples may be determined by using an oscilloscope and known clock rates to analyse the number of samples that would be taken while a signal was within the metastable zone. As would be understood by the skilled person, the number of metastable samples is a probabilistic estimate which scales with the difference in frequency between the first clock signal and the second clock signal (i.e. the difference in clock rates between the clock domains). The Applicant has also found that the presence of noise is likely to increase the number of metastable samples.

In a set of embodiments, the bounce-rejection circuit portion comprises a plurality of flip flops providing at least some of the plurality of successive samples. A first sample may be provided by the synchroniser and the remaining samples (of the plurality of successive samples) may be provided by the plurality of flip flops. For example, if the number of successive samples is K, then the number of flip flops providing samples is K−1.

In a set of embodiments, the bounce-rejection circuit portion operates on the plurality of successive samples using combinatorial logic that performs a combinatorial function. The combinational function (e.g. "Sel") may favour zeros, ones or be symmetric. The combinational function may apply weights to different samples.

In a set of embodiments, the bounce-rejection circuit portion comprises an accumulator which determines how many of the last K samples had a value of '0' and how many have a value of '1' by summing the samples accumulated over (the last) K clock cycles and the output of the accumulator is input to a first comparator and a second comparator. The first comparator may compare its input to a threshold number of K−P (e.g. to determine if at least P out of the last K samples have the value of "0") and the second comparator may compare its input to a threshold number of P (e.g. to determine if at least P out of the last K samples have the value of "1").

In a set of embodiments, the bounce-rejection circuit portion comprises a multiplexer and an output flip flop coupled together, wherein the output flip flop feeds back its output to an input of the multiplexer. The multiplexer may be a 2-to-1 multiplexer. The combinatorial logic may comprise the multiplexer.

In a set of embodiments, wherein the bounce-rejection circuit portion comprises a multiplexer, a first comparator and a second comparator, the multiplexer receives:

an output of the second comparator as a first data input;

an output from the bounce rejection circuit portion (e.g. from the output flip flop) as a second data input; and an output of an OR gate as its selection input; wherein the OR gate receives its inputs from the first comparator and the second comparator.

In a set of embodiments, the output flip flop provides the output of the bounce-rejection circuit portion.

These features, therefore, may help to allow the bounce rejection circuit portion to change the output signal from a first value to a second value if a proportion of said plurality of successive samples having said second value is determined to meet (or exceed) a threshold; or otherwise, maintain the output signal at the first value.

As has been described above, embodiments of the invention are particularly useful when 'ringing' is present. Ringing is typically caused by external factors and the impedance resistance capacitance (LRC) characteristics.

In a set of embodiments, a handshake synchroniser system comprises:

a first clock domain clocked at the first frequency and arranged to provide the signal clocked at the first frequency; and a second clock domain clocked at the second frequency; the second clock domain comprising the circuit portion described herein.

Furthermore, embodiments of the invention are also particularly useful when transitioning to a higher clock frequency. When transitioning from a lower clock frequency to a higher clock frequency, given the clock frequency relationship, more metastable samples are likely to be taken. Thus, the likelihood of undesirable bounces increases. Therefore, in some embodiments, the second frequency is greater than the first frequency.

However, as embodiments of the invention may be generally useful for transitioning from a first clock domain clocked at a first frequency to a second clock domain clocked at a second frequency, the first frequency being different to the second frequency; the invention extends to a handshake synchroniser system comprising the circuit portion described herein and arranged to perform the method described herein. Typically, in such handshake synchroniser systems, request and acknowledgement signals are sent across a clock domain boundary between at least two clock domains.

Therefore, in some embodiments, a handshake synchroniser system comprises:

a first clock domain comprising a circuit portion according to the second aspect of the invention; and a second clock domain comprising a second circuit portion comprising:

a second synchroniser comprising:

a second signal input for receiving a signal clocked at the second frequency; and a second signal output for outputting a synchronised signal clocked at the first frequency; and a second bounce-rejection circuit portion arranged to receive a synchronised signal from the output of the second synchroniser; the bounce-rejection circuit portion being arranged to operate on a plurality of successive samples of the synchronised signal and output an output signal; wherein the second bounce-rejection circuit portion is arranged to:

change the output signal from a first value to a second value if a proportion of said plurality of successive samples having said second value is determined to meet a threshold, wherein the threshold is greater than 50% of the plurality of successive samples; or otherwise, maintain the output signal at the first value.

The applicant recognises that this is novel and inventive in its own right and, thus, when viewed from a further aspect, the invention provides a handshake synchroniser system for synchronising a signal at a clock domain crossing, comprising:

a first clock domain comprising:

a first synchroniser comprising a first signal input for receiving a signal clocked at a second frequency and a first signal output for outputting a synchronised signal clocked at a first frequency; and a second clock domain comprising:

a second synchroniser comprising a second signal input for receiving a signal clocked at the first frequency and a second signal output for outputting a synchronised signal clocked at the second frequency; and wherein each of the first and second clock domains comprise a respective bounce-rejection circuit portion arranged to receive a respective synchronised signal from the output of their respective synchroniser; each bounce-rejection circuit portion being arranged to operate on a plurality of successive samples of the respective synchronised signal and output a respective output signal; wherein each bounce-rejection circuit portion is arranged to:

change its output signal from a first value to a second value if a proportion of said plurality of successive samples having said second value is determined to meet a threshold, wherein the threshold is greater than 50% of the plurality of successive samples; or otherwise, maintain its output signal at the first value.

Features disclosed in relation to the first and/or second aspects of the invention may be applied to the aspects relating to the handshake synchroniser system.

The invention extends to a method for operating the handshake synchroniser system described herein.

Features of any aspect or embodiment described herein may, wherever appropriate, be applied to any other aspect or embodiment described herein. Where reference is made to different embodiments or sets of embodiments, it should be understood that these are not necessarily distinct but may overlap.

BRIEF DESCRIPTION OF THE DRAWINGS

Certain preferred embodiments of the invention will now be described, by way of example only, with reference to the accompanying drawings, in which.

DETAILED DESCRIPTION

When synchronising a data signal coming from another clock domain, undesired bounces may be present due to sampling in the 'metastable zone', i.e. caused by sampling too close to a signal edge, which can lead to the loss of samples or production of extra samples. The cause of these unwanted pulses could include a ringing line, external noise, glitches, mechanical bounces from a switch, etc.

Figure 1:
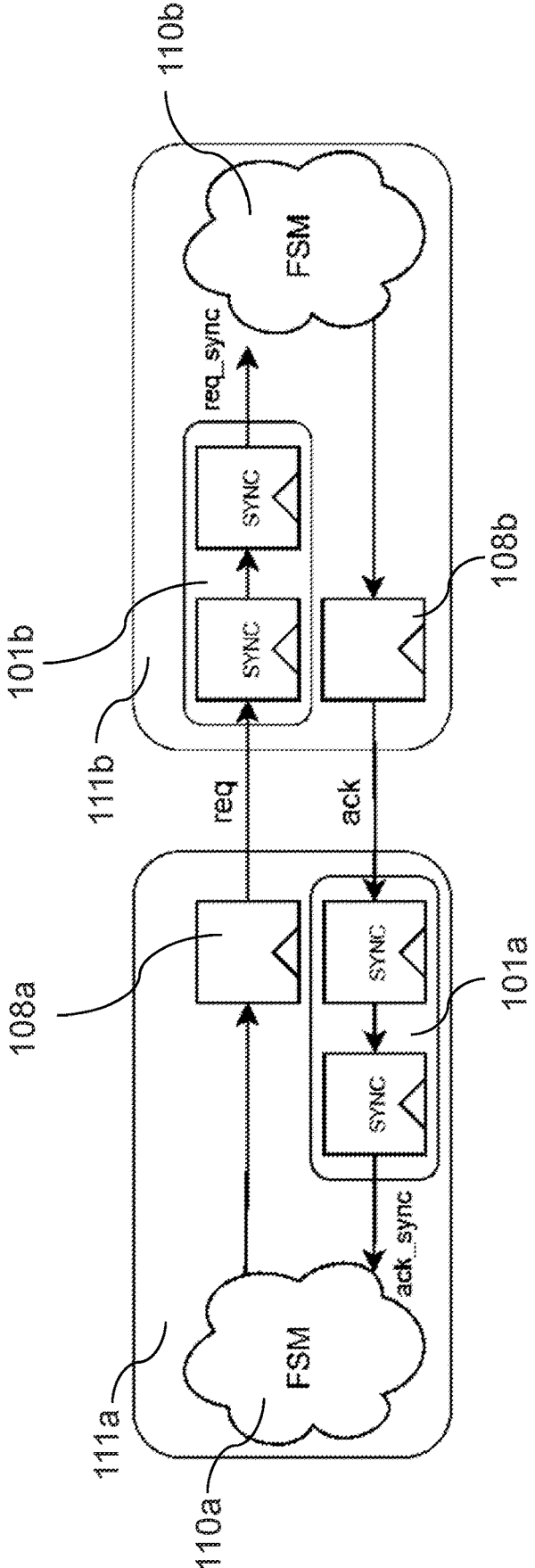
FIG. 1 is a schematic diagram of a handshake synchroniser system according to the prior art.

An example of a typical handshake synchroniser system affected by an input bounce is shown in FIG. 1.

FIG. 1 shows a first clock domain 111a and a second clock domain 111b. The first clock domain is clocked by a first clock (not shown) running at a first frequency and the second clock domain is clocked by a second clock (not shown) running at a second frequency. The frequencies of each clock domain are different to each other and in this example the second frequency is lower than the first frequency, but equally it could be higher.

In the first clock domain 111a, the first synchroniser 101a is connected to a first finite state machine (FSM) 110a, which is connected to a first output flip flop 108a. Similarly, in the second clock domain 111b, the second synchroniser 101b is connected to a second FSM 110b, which is connected to a second output flip flop 108b. A 'request' signal is shown being sent from the first clock domain 111a to the second clock domain 111b. An 'acknowledgement' signal is shown being sent, in response, from the second clock domain 111b to the first clock domain 111a.

Figure 2:
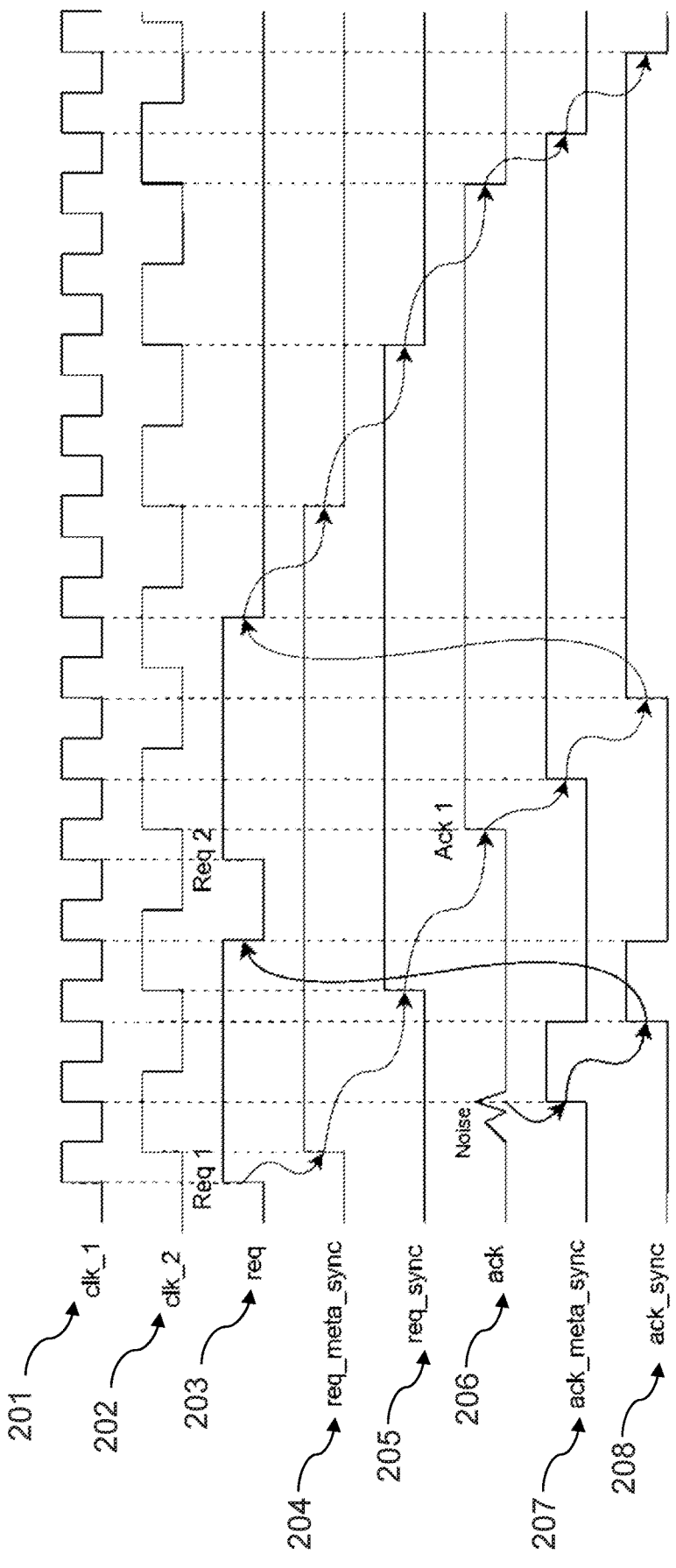
FIG. 2 is a timing diagram illustrating how a bounce causes sample loss.

The corresponding timing diagram of FIG. 2 shows in general how noise on one of the lines causes one of the requests to be lost, resulting in a sample being lost. The rows 201-208 of the timing diagram illustrate the various signals present in the handshaker system of FIG. 1.

The timing diagram has eight rows 201-208 representing the following signals: the first row 201 shows the clock signal of the first clock domain 111a (clk_1); the second row 202 shows the clock signal of the second clock domain 111b (clk_2); the third row 203 shows the request signal from the first clock domain 111a to the second clock domain 111b (req); the fourth row 204 shows the metastable signal present between the flip flops of the second synchroniser 101b (req_meta_sync); the fifth row 205 shows the signal output from the second synchroniser 101b (req_sync), the sixth row 206 shows the acknowledgment signal from the second clock domain 111b to the first clock domain 111a (ack), the seventh row 207 shows the metastable signal present between the flip flops of the first synchroniser 101a (ack_meta_sync), and the eighth row 208 shows the signal output from the first synchroniser 101a (ack_sync).

As can be seen in the sixth row ("ack") 206 noise present in the signal triggers the "ack_meta-sync" signal 207 to go high erroneously which then triggers the "ack_sync" signal 208 to go high as a consequence which causes the "req" signal 203 to go low. Meanwhile the "req_sync" signal 205 goes high on the next rising edge of the second clock signal 202 because of the first request signal Req 1 in the normal way, which is thus followed by the "ack" signal 206 going high, at point Ack 1 to acknowledge Req 1. However, before this has happened, the first domain 111a has issued a second request signal Req 2 on the "req" line 203. However, because the second domain is still dealing with the first request Req 1 (by issuing Ack 1) the Req 2 signal (on row 203) is missed.

Figure 3:
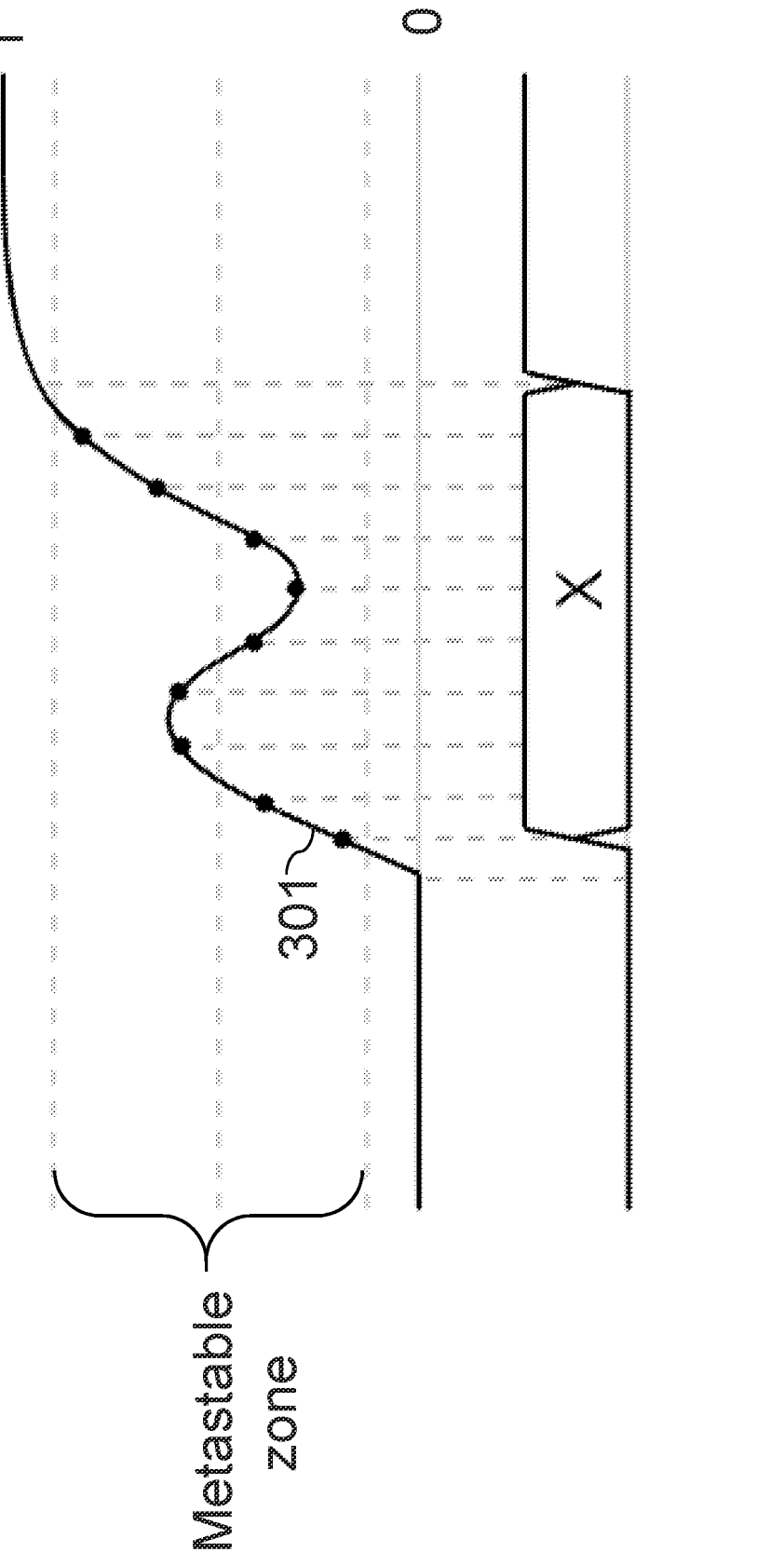
FIG. 3 is a schematic diagram illustrating metastable sampling.

FIG. 3 illustrates sampling taking place when the signal is within the metastable zone, which can cause signal bounces. FIG. 3 shows a typical transition pattern of a signal 301 transitioning between 0 and 1. There is some ringing present causing the signal 301 to oscillate within a "metastable zone" which occupies a region between 0 and 1. In this metastable zone the output is undetermined. As the signal 301 is regularly sampled, a number of metastable samples (MS) will be taken while the signal is in the metastable zone. In FIG. 3 it can be seen that nine metastable samples are taken. As will be appreciated the number of metastable samples will depend on the sampling rate (i.e. the frequency of the receiving clock domain) and the duration of the metastable zone. This number of metastable samples, MS, can therefore be estimated using an oscilloscope to estimate the duration of the metastable zone in terms of the number of samples taken in that time.

Embodiments of the invention are outlined below which provide an integrated circuit having a bounce-rejection circuit portion for removing, i.e. rejecting, these bounces.

Figure 4:
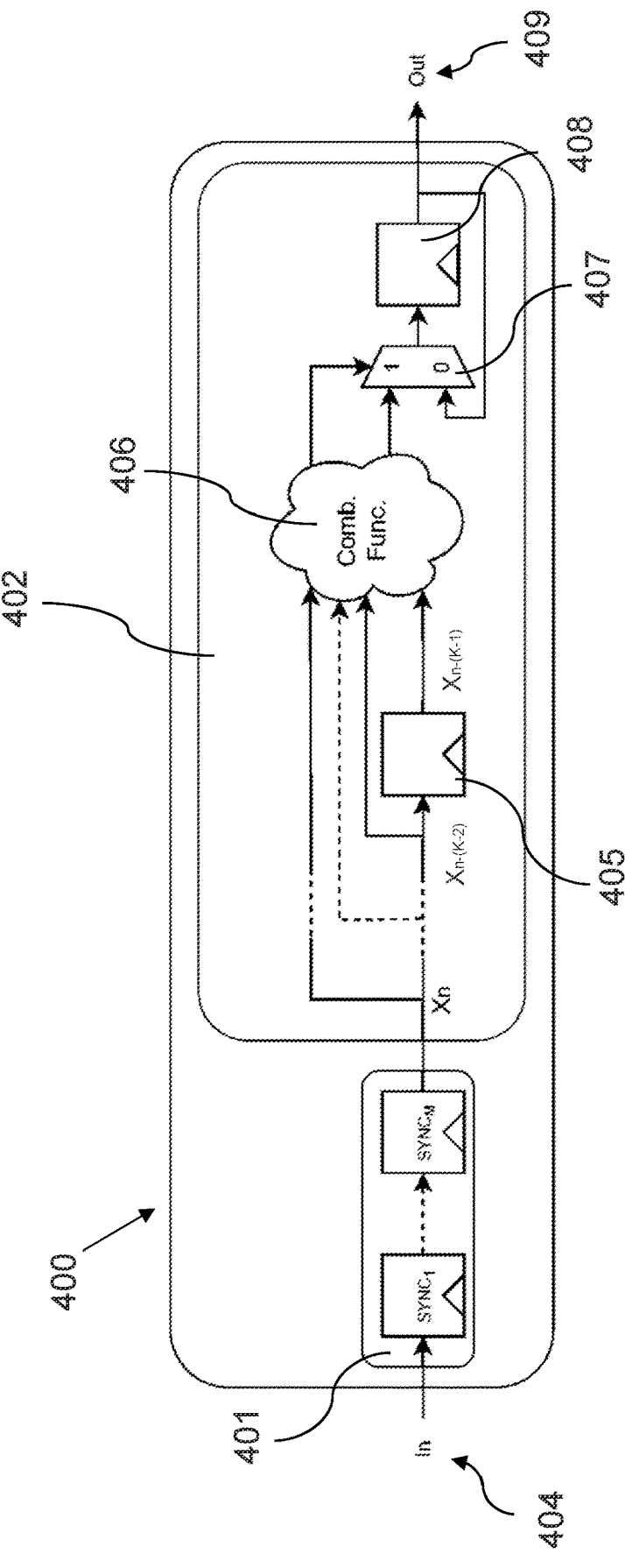
FIG. 4 is a schematic diagram of a circuit embodying the invention.

FIG. 4 shows a circuit portion 400 of an integrated circuit embodying the invention. The circuit portion 400 comprises a synchroniser 401 and a bounce-rejection circuit portion 402. The circuit portion 400 comprises an input 404 to the synchroniser 401 and an output 409 from the bounce-rejection portion 402.

An asynchronous signal (In) is provided at the input 404 of the synchroniser 401. The synchroniser 401 synchronises the data signal to its clock (not shown). The bounce-rejection circuit portion 402 receives the output of the synchroniser 401 and as is described in greater detail below effectively filters the signal to reject bounces. The output of the bounce-rejection circuit portion therefore provides a synchronised output signal (Out) with any bounces removed.

The synchroniser 401 has a number (M) of flip flops which is at least two. The bounce-rejection circuit portion 402 has a set of K−1 flip flops (registers) 405 for storing the last K−1 synchronous samples ($X_{n-1}$, $X_{n-(k-2)}$, . . . , $X_{n-(k-1)}$; combinatorial function logic 406; a multiplexer 407; and an output flip flop 408. The combinatorial function logic 406 receives signals representing each of the K samples (i.e. the K−1 samples stored in the registers and the synchronous sample $X_n$ output from the synchroniser) and uses these to provide two of the three inputs to the multiplexer 407. The other input to the multiplexer 407 is provided by the output signal 409 from the output flip flop 408 being fed back to the multiplexer 407.

Figure 5:
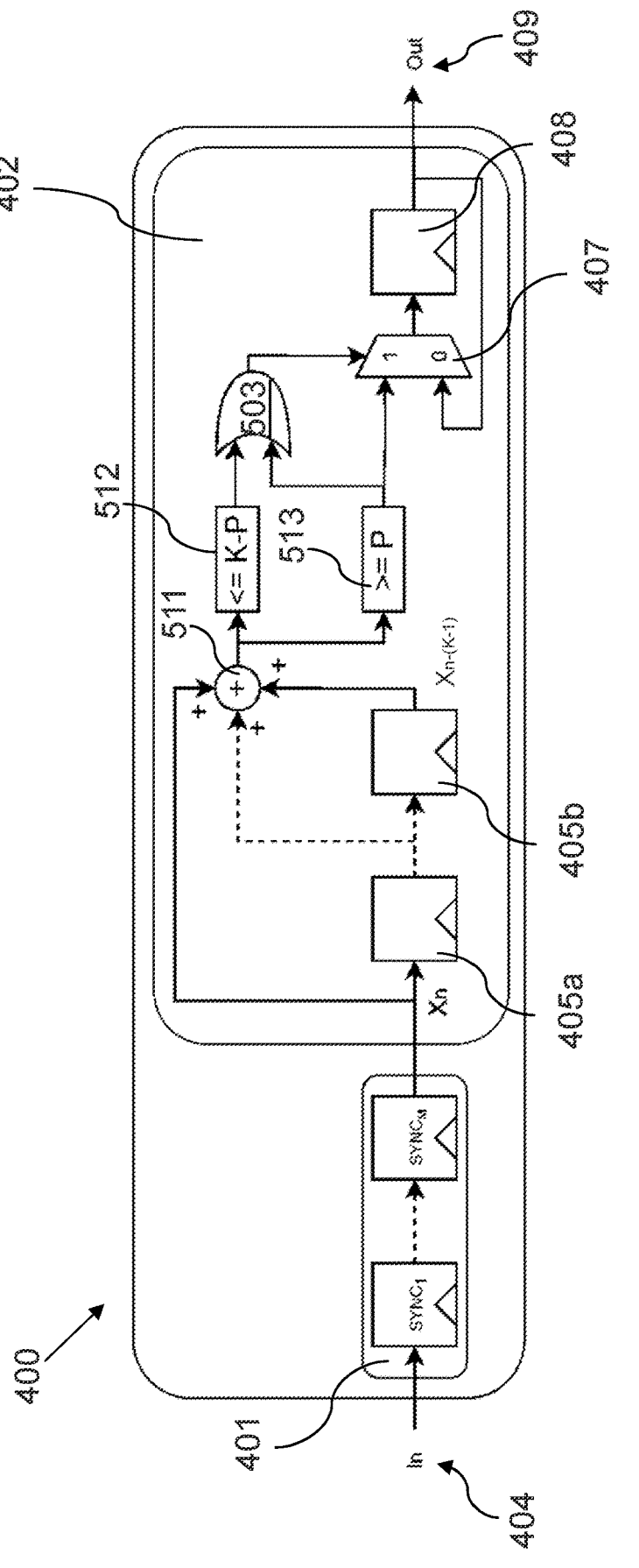
FIG. 5 is a schematic diagram showing the embodiment of FIG. 4 in more detail.

FIG. 5 is a schematic diagram showing the embodiment of FIG. 4, particularly the combinatorial function logic 406, in more detail. This comprises an accumulator 511 for accumulating the last K samples; a first comparator 512; a second comparator 513 and an OR gate 503. FIG. 5 also shows two of the K−1 registers (sampling flip flops) 405a, 405b.

Operation of the embodiment shown in FIGS. 4 and 5 will now be described.

The synchroniser 401 receives an asynchronous signal, i.e. from another clock domain being clocked at a different clock rate. The synchroniser 401 has set of M registers (i.e. flip flops) which are used to prevent metastability from propagating forward. A synchronised signal ($X_n$) is output from the synchroniser 401 and presented to the bounce-rejection circuit portion 402.

In the bounce-rejection circuit portion 402, a set of K−1 registers in the form of the flip flops (only two of which are shown) 405a-b, are used for storing the last K−1 synchronous samples. The synchronised signal $X_n$ itself together with the samples which are output from the plurality of flip flops (e.g. $X_n$, $X_{n-1}$, . . . , $X_{n-(K-1)}$) are the K samples that are input to the accumulator 511.

The accumulator 511 determines how many of the last K samples had a value of '0' and how many have a value of '1' by summing the samples accumulated over the last K clock cycles. It will be appreciated by those skilled in the art, is not necessary to wait for K clock cycles each time as on every clock cycle an older sample is replaced by a newer sample.

The summed value will be a number smaller than or equal to K (i.e. representative of the number of '1's in the last K samples). The output of the accumulator 511 is input to the two comparators 512, 513. The first comparator 512 compares the value provided by the accumulator 511 to a threshold number of '0's, i.e. K−P, and the second comparator 513 compares the value from the accumulator 511 to a threshold number of '1's, i.e. P.

If the first comparator 512 finds that the summed value from the accumulator 511 is less than or equal to K−P, meaning it meets the threshold number of '0's, then it will follow that the second comparator 513 does not meet the threshold number of '1's, i.e. the summed value is less than P.

In this case, the output of the first comparator 512 will be '1' (high) and the output of the second comparator 513 will be '0' (low). These outputs are fed to the OR gate 503 which outputs a '1'. The '1' from the OR gate 503 is input to the Select input of the multiplexer 407. This causes the multiplexer 407 to select the upper input (labelled 1) which provides the value '0' from the comparator 513 to the output flip flop 408.

In another case, if the first comparator 512 finds that the summed value from the accumulator 511 is more than K−P, meaning it does not meet the threshold number of '0's, then it will follow that the second comparator 513 does meet the threshold number of '1's, i.e. the summed value is more than or equal to P.

In this case, the output of the first comparator 512 will be '0' (low) and the output of the second comparator 513 will be '1' (high). These outputs are fed to the OR gate 503 which outputs a '1'. The '1' from the OR gate 503 is input to the Sel input of the multiplexer 407. This causes the multiplexer 407 to select the upper input (labelled 1) which provides the value '1' from the comparator 513 to the output flip flop 408.

If neither threshold is met, e.g. if P=6, K=10 and the value accumulated over the last K clock cycles is 5, then both comparators 512, 513 output '0'. In this case, the OR gate 503 outputs a '0' and the lower input to the multiplexer (labelled 0) is selected to be output from the multiplexer

407. This allows the current output of the bounce-rejection circuit portion to be maintained, as the output from the output flip flop 408 is fed back to the multiplexer 407.

This arrangement means that it is determined whether a new value in conjunction with the last K−1 previous values has met or exceeded the threshold of P of K samples.

This, therefore, allows the bounce rejection logic to change the output signal from a first value to a second value if a proportion of the plurality of successive samples having the second value is determined to meet a threshold; or otherwise, maintain the output signal at the first value.

Thus, the new output is calculated as a function of the current output, the current synchronous input and the last K−1 synchronous input samples.

Below are some examples of possible transitions from zero to one given different numbers of metastable samples (MS). Changing from one to zero would be analogous. Some of the sequences will be harmless while others, denoted with square brackets ("[ . . . ]"), are introducing undesired bounces that can affect the system and which therefore should be filtered.

If the number of metastable samples (MS) is two, then the number of possible transitions is four and the output of the synchronizer will be . . . 0XX1 . . . , where X could be either 0 or 1. For example, the possible transitions are . . . 0001 . . . , . . . 0011 . . . , [ . . . 0101 . . . ], or . . . 0111 . . . .

A bounce can be identified by seeing that the signal has gone from low to high and then low again—i.e. effectively a false pulse is output.

If the number of metastable samples (MS) is three, then the number of possible transitions is eight and the output of the synchronizer will be . . . 0XXX1 . . . , where X could be either 0 or 1 . . . 00001 . . . , . . . 00011 . . . ,[ . . . 00101 . . . ], . . . 00111 . . . , [ . . . 01001 . . . ], [ . . . 01011 . . . ], [ . . . 01101 . . . ], or . . . 01111 . . . .

If the number of metastable samples (MS) is four, then the number of possible transitions is 16 and the output of the synchronizer will be . . . 0XXXX1 . . . , where X could be either 0 or 1 . . . 000001 . . . , . . . 000011 . . . , [ . . . 000101 . . . ], . . . 000111 . . . , [ . . . 001001 . . . ], [ . . . 001011 . . . ], [ . . . 001101 . . . ], . . . 001111 . . . , [ . . . 010001 . . . ], [ . . . 010011 . . . ], [ . . . 010101 . . . ], [ . . . 010111 . . . ], [ . . . 011001 . . . ], [ . . . 011011 . . . ], [ . . . 011101 . . . ], . . . 011111 . . . .

As it can be seen, the greater the number of metastable samples (MS) the greater the probability of getting undesired bounces.

If the circuit is symmetric, which means that it responds in a similar way to zeros and ones, the analysis of changing from zero to one is analogous to a change from one to zero. Therefore, for simplicity purposes the analysis has been limited to one case.

If there is a certain number of metastable samples (MS) there will be $2^{MS}$ possible transitions from zero to one or one to zero at the output of the synchroniser. To discard all the bounces and have a clean transition at the output, the bounce rejection circuit should preferably be capable of filtering the lowest frequency bounce which is the biggest bounce possible.

The biggest possible bounce will have a period of MS samples with MS/2 samples being zero and MS/2 samples being one. That would be . . . 01 . . . 10 . . . 01 . . . when changing from zero to one, and . . . 10 . . . 01 . . . 10 . . . when changing from one to zero. An example for six metastable samples (MS=6) would be . . . 01110001 . . . or . . . 10001110 . . . .

In order to filter all the possible bounces, the number of samples being used as a threshold, whether it is an undesired bounce or an actual transition, should be greater than half the number of metastable samples (MS/2). The applicant has determined that this may help to prevent the output from switching twice during the transition sequence.

$$\frac{MS}{2} < P < K$$

The applicant has determined that the optimal P requires finding the minimum number of samples (P) that satisfies the previous equation.

$$P_{opt} = \text{ceil}\left(\frac{MS+1}{2}\right),$$

On the other hand, P/K should be greater than 50% so K should be less than 2P.

$$P \leq K < 2P$$

Choosing a K greater than P allows for a threshold lower than 100% for the bounce rejection which helps to decrease the latency of the system. This is because a change in signal can be permitted earlier than if all of the last K samples had to be at the new value.

Hence, the selection of P helps to guarantee the performance of the bounce-rejection circuit portion so that preferably all of the undesired bounces are filtered out. The selection of K helps to decrease the latency by considering a larger time window.

Although the embodiment described above shows a proportion of samples, P out of K, are used as a threshold for changing the output, it could be that the threshold is 100% so that P=K. To implement this P=K case, the combinatorial logic may be arranged so that to update the output it is necessary for all the samples to be the same, i.e. high ("1") or low ("0").

Below, Tables 1-3 contain experimental data which show how latency is improved when using a bounce-rejection circuit portion at the output of a synchroniser that uses a threshold proportion below 100% i.e. P/K where P<K, P being the threshold number of samples and K being the total number of samples).

The results which show an improved latency are denoted with an asterisk (*).

The first column of each table, represents the output of the synchroniser (and input of the bounce rejection logic) for the different clock cycles, T0, T1, T2, T3, . . . starting with T0 (at time 0) when the signal is on a stable value of 0 and ending when the signal has a stable value of 1 (at T3 for Table 1, T4 for Table 2 and T5 for Table 3).

The periods in between contain the MS (Metastable Samples) which give the different possible transitions.

It can be seen in Tables 1-3 that latency is reliably improved when P/K is a proportion less than 100% (e.g. from 60%-80%), i.e. in line with the embodiment shown in FIG. 5, compared to when it is 100%.

The latency, starting from the first transition sample, is measured in the number of clock cycles that have elapsed (i.e. equivalent to the number of samples taken at times T0, T1, T2, . . . which occur every clock cycle) before the transition of the signal after being filtered by the bounce-rejection circuit portion.

TABLE 1

| Different Transitions For MS = 2 . . . T0, T1, T2, T3, . . . . . . 0, X, X, 1 . . . | Latency for a Symmetric Bounce Rejection K/K P = K = 2 K/K = 100% | Latency for a Symmetric Bounce Rejection P/K P = 2; K = 3 P/K = 66.6% |
|---|---|---|
| . . . 0001 . . . | 4 | 4 |
| . . . 0011 . . . | 3 | 3 |
| . . . 0101 . . . | 4 | 3* |
| . . . 0111 . . . | 2 | 2 |

TABLE 2

| Different Transitions For MS = 3 . . . T0, T1, T2, T3, T4, . . . . . . 0, X, X, X, 1 . . . | Latency for a Symmetric Bounce Rejection K/K P = K = 3 K/K = 100% | Latency for a Symmetric Bounce Rejection P/K P = 3; K = 4 P/K = 75% | Latency for a Symmetric Bounce Rejection P/K P = 3; K = 5 P/K = 60% |
|---|---|---|---|
| . . . 00001 . . . | 6 | 6 | 6 |
| . . . 00011 . . . | 5 | 5 | 5 |
| . . . 00101 . . . | 6 | 5* | 5* |
| . . . 00111 . . . | 4 | 4 | 4 |
| . . . 01001 . . . | 6 | 6 | 5* |
| . . . 01011 . . . | 5 | 4* | 4* |
| . . . 01101 . . . | 6 | 4* | 4* |
| . . . 01111 . . . | 3 | 3 | 3 |

TABLE 3

| Different Transitions For MS = 4 T0, T1, T2, T3, T4, T5 . . . . . . 0, X, X, X, X, 1 . . . | Latency for a Symmetric Bounce Rejection K/K P = K = 4 K/K = 100% | Latency for a Symmetric Bounce Rejection P/K P = 4; K = 5 P/K = 80% | Latency for a Symmetric Bounce Rejection P/K P = 4; K = 6 P/K = 66.6% |
|---|---|---|---|
| . . . 000001 . . . | 8 | 8 | 8 |
| . . . 000011 . . . | 7 | 7 | 7 |
| . . . 000101 . . . | 8 | 7* | 7* |
| . . . 000111 . . . | 6 | 6 | 6 |
| . . . 001001 . . . | 8 | 8 | 7* |
| . . . 001011 . . . | 7 | 6* | 6* |
| . . . 001101 . . . | 8 | 6* | 6* |
| . . . 001111 . . . | 5 | 5 | 5 |
| . . . 010001 . . . | 8 | 8 | 8 |
| . . . 010011 . . . | 7 | 7 | 6* |
| . . . 010101 . . . | 8 | 7* | 6* |
| . . . 010111 . . . | 6 | 5* | 5* |
| . . . 011001 . . . | 8 | 8 | 6* |
| . . . 011011 . . . | 7 | 5* | 5* |
| . . . 011101 . . . | 8 | 5* | 5* |
| . . . 011111 . . . | 4 | 4 | 4 |

It will be appreciated by those skilled in the art that the invention has been illustrated by describing one or more specific embodiments thereof, but is not limited to these embodiments; many variations and modifications are possible, within the scope of the accompanying claims.

The invention claimed is:

1. A method of operating a circuit portion, comprising:
receiving, at a synchroniser, a signal clocked at a first frequency;
outputting a synchronised signal clocked at a second frequency to a bounce-rejection circuit portion;

the bounce-rejection circuit portion operating on a plurality of successive samples of the synchronised signal and outputting an output signal, wherein the bounce-rejection circuit portion:
changes the output signal from a first logic value to a second logic value if a proportion of said plurality of successive samples having said second logic value is determined to meet a threshold, wherein the threshold is greater than 50% of the plurality of successive samples; or
otherwise, maintains the output signal at the first logic value.

2. The method of claim 1, wherein the threshold is from 60% to 80%.

3. The method of claim 1, wherein the threshold is greater than half of an estimated number of metastable samples.

4. The method of claim 1, wherein the threshold is equal to at least the estimated number of metastable samples plus one, all divided by two.

5. The method of claim 1, wherein the bounce-rejection circuit portion comprises a plurality of flip flops providing at least some of the plurality of successive samples.

6. The method of claim 1, comprising
using a first comparator to compare with its respective input with the number of the plurality of successive samples minus the threshold; and
using a second comparator to compare its respective input to the threshold.

7. The method of claim 1, wherein the bounce-rejection circuit portion comprises a or the multiplexer and an output flip flop coupled together, wherein the output flip flop feeds back its output to an input of the multiplexer.

8. The method of claim 5, comprising providing a first sample of the plurality of successive samples by the synchroniser and providing the remaining samples of the plurality of successive samples by the plurality of flip flops.

9. The method of claim 6, comprising:
summing the plurality of successive samples accumulated by an accumulator;
providing the output of the accumulator to the first comparator and the second comparator.

10. The method of claim 6, wherein the bounce-rejection circuit portion comprises a multiplexer, the method comprising the multiplexer:
receiving at a first data input of the multiplexer an output from the second comparator;
receiving at a second data input of the multiplexer an output from the bounce rejection circuit portion.

11. The method of claim 9, comprising:
the first comparator comparing the output of the accumulator to the number of the plurality of successive samples minus the threshold; and
the second comparator comparing the output of the accumulator to the threshold.

12. A circuit portion comprising:
a synchroniser comprising:
a signal input for receiving a signal clocked at a first frequency; and
a signal output for outputting a synchronised signal clocked at a second frequency; and
a bounce-rejection circuit portion arranged to receive a synchronised signal from the output of the synchroniser; the bounce-rejection circuit portion being arranged to operate on a plurality of successive samples of the synchronised signal and output an output signal; wherein the bounce-rejection circuit portion is arranged to:

change the output signal from a first logic value to a second logic value if a proportion of said plurality of successive samples having said second logic value is determined to meet a threshold, wherein the threshold is greater than 50% of the plurality of successive samples; or otherwise, maintain the output signal at the first logic value.

13. The circuit portion of claim 12, wherein the threshold is from 60% to 80%.

14. The circuit portion of claim 12, wherein the threshold is greater than half of an estimated number of metastable samples.

15. The circuit portion of claim 12, wherein the bounce-rejection circuit comprises:

a first comparator arranged to compare its respective input with the number of the plurality of successive samples minus the threshold; and a second comparator arranged to compare its respective input to the threshold.

16. The circuit portion of claim 12, wherein the bounce-rejection circuit portion comprises a multiplexer, the multiplexer being arranged to:

receive at a first data input of the multiplexer an output from the second comparator;

receive at a second data input of the multiplexer an output from the bounce rejection circuit portion.

17. The circuit portion of claim 12, wherein the bounce-rejection circuit portion comprises a or the multiplexer and an output flip flop coupled together, wherein the bounce-rejection circuit portion is arranged so that the output flip flop feeds back its output to an input of the multiplexer.

18. The circuit portion of claim 15, wherein the bounce-rejection circuit portion comprises an accumulator arranged to sum the plurality of successive samples; and wherein the bounce-rejection circuit portion is arranged to provide the output of the accumulator to the first comparator and the second comparator.

19. The circuit portion of claim 18, wherein the bounce-rejection circuit portion is arranged so that:

the first comparator compares the output of the accumulator to the number of the plurality of successive samples minus the threshold; and the second comparator compares the output of the accumulator to the threshold.

20. A handshake synchroniser system for synchronising a signal at a clock domain crossing, comprising:

a first clock domain comprising:

a first synchroniser comprising a first signal input for receiving a signal clocked at a second frequency and a first signal output for outputting a synchronised signal clocked at a first frequency; and a second clock domain comprising:

a second synchroniser comprising a second signal input for receiving a signal clocked at the first frequency and a second signal output for outputting a synchronised signal clocked at the second frequency; and wherein each of the first and second clock domains comprise a respective bounce-rejection circuit portion arranged to receive a respective synchronised signal from the output of their respective synchroniser; each bounce-rejection circuit portion being arranged to operate on a plurality of successive samples of the respective synchronised signal and output a respective output signal; wherein each bounce-rejection circuit portion is arranged to:

change its output signal from a first logic value to a second logic value if a proportion of said plurality of successive samples having said second logic value is determined to meet a threshold, wherein the threshold is greater than 50% of the plurality of successive samples; or otherwise, maintain its output signal at the first logic value.

* * * * *